United States Patent
Beitia

(10) Patent No.: US 7,707,885 B2
(45) Date of Patent: May 4, 2010

(54) METHOD FOR TEMPERATURE-COMPENSATED GYROMETRIC MEASUREMENT AND GYROMETRIC MEASUREMENT DEVICE USING SAME

(75) Inventor: José Beitia, Saint Prix (FR)

(73) Assignee: Sagem Defense Securite, Paris (FR)

( * ) Notice: Subject to any disclaimer, the term of this patent is extended or adjusted under 35 U.S.C. 154(b) by 307 days.

(21) Appl. No.: 11/817,130

(22) PCT Filed: Feb. 20, 2006

(86) PCT No.: PCT/FR2006/000378

§ 371 (c)(1),
(2), (4) Date: Oct. 31, 2007

(87) PCT Pub. No.: WO2006/090053

PCT Pub. Date: Aug. 31, 2006

(65) Prior Publication Data

US 2008/0229823 A1    Sep. 25, 2008

(30) Foreign Application Priority Data

Feb. 25, 2005    (FR) .................................... 05 01952

(51) Int. Cl.
   *G01C 19/56*    (2006.01)
(52) U.S. Cl. ...................... 73/504.12; 73/497; 73/1.38; 73/1.77
(58) Field of Classification Search ............. 73/504.12, 73/504.04, 504.13, 504.15, 504.16, 504.14, 73/1.38, 1.77, 497
See application file for complete search history.

(56) References Cited

U.S. PATENT DOCUMENTS

| 4,479,098 | A |   | 10/1984 | Watson et al. | |
|---|---|---|---|---|---|
| 5,806,364 | A |   | 9/1998 | Kato et al. | |
| 6,651,499 | B2 | * | 11/2003 | Fell et al. | 73/504.12 |
| 7,240,533 | B2 | * | 7/2007 | Fell et al. | 73/1.38 |

FOREIGN PATENT DOCUMENTS

JP    03267712 A1    11/1991

* cited by examiner

*Primary Examiner*—Helen C. Kwok
(74) *Attorney, Agent, or Firm*—Patzik, Frank & Samotny Ltd.

(57) ABSTRACT

The invention concerns gyrometric measurement compensated as a function of the instantaneous internal temperature of a mechanical resonator in a gyrometric measurement device comprising a loop controlling the amplitude of the resonator vibration and a gyrometric loop delivering a gyrometric signal (S); the gain control (P) of the loop varies as a monotonous function, preferably increasing and of the first order, of the internal temperature of the resonator in a given range of temperature; during a calibrating step, a correspondence is established and stored between the values of the gyrometric scaling factor (Fe) and the gyrometric bias ($S_O$) and the values of the gain control signal (F), that is F(P) and Q(P) respectively; in operation, the following operations are carried out: P→F(P), P→Q(P), and $\Omega'_{est}$=F(P)·S+Q(P) which is a more precise analog estimate, compensated as a function of the internal temperature of the resonator, of the mechanical rotation of the sensitive axis of the resonator.

10 Claims, 2 Drawing Sheets

METHOD FOR TEMPERATURE-COMPENSATED GYROMETRIC MEASUREMENT AND GYROMETRIC MEASUREMENT DEVICE USING SAME

FIELD OF THE INVENTION

The present invention relates in general manner to the field of rate gyro measurement, and more precisely it relates to improvements applied to rate gyro measurement methods compensated as a function of the instantaneous internal temperature of a resonator in a gyro measurement device comprising:

at least one mechanical resonator;

a loop for controlling the amplitude of the vibration of the mechanical resonator; and a gyro loop suitable for delivering an output rate signal.

The invention also relates to a rate gyro measurement device implementing said improved method.

DESCRIPTION OF THE PRIOR ART

FIG. 1 of the accompanying drawing is a very diagrammatic block diagram showing a conventional rate gyro measurement device comprising a mechanical resonator 1 and an electronics unit 2 for operating the gyro.

This electronics unit 2 includes a loop 3 for controlling the amplitude of the vibration of the mechanical resonator 1, which loop 3 receives drive detection signals 4 (excitation electrodes) of the resonator 1 that are applied to an amplitude measurement circuit 5 whose output is connected to a comparator 6 that also receives an amplitude set point signal 7; the output from the comparator 6 is connected to a corrector circuit 8 having an output that delivers a signal 9 for controlling gain P. The drive detection signals 4 are also applied to a phase shifter network 10 having an output signal that is applied to a multiplier circuit 11 that also receives the signal 9 for controlling the gain P. The output signal from the multiplier circuit 11 is the excitation or drive control signal 12 that is applied to the excitation electrodes.

The electronics unit 2 also has a gyro loop 13 having an input receiving the Coriolis detection signals 14 delivered by the detection electrodes of the resonator 1 and having an output delivering a signal 15 for application to detection electrodes. Another output from the gyro loop 13 delivers a measurement signal S.

The device shown in FIG. 1 thus delivers two signals, namely the signal for controlling the gain P and the output measurement signal S, both of which are continuous analog signals.

External rotation applied about the sensing axis of the mechanical resonator is then estimated from the output gyro signal S using the formula:

$$\Omega_{est} = Fe \cdot S + S_0$$

where Fe is the gyro scale factor and $S_0$ is the gyro bias.

At present, it is indeed known to compensate rate gyro measurements as a function of temperature.

Effective temperature compensation of gyro measurements needs to take account of variations in the temperature of the mechanical resonator itself. This result could naturally be obtained by implanting a temperature probe on or in the resonator proper. Nevertheless, such a solution cannot be envisaged since the mere presence of a probe on or in the resonator would disturb its vibration and the operation of the gyro measurement device would be spoilt thereby.

As a result, it is known to place a temperature probe as close as possible to the resonator, but without making physical contact therewith. It is then not the exact temperature of the resonator that is detected, but rather the temperature of the surroundings in which it is situated: that solution is not sufficiently accurate. In addition, putting a temperature probe very close to the resonator is complicated since there is little space available for that purpose.

Finally, it should be emphasized that having recourse to a temperature probe leads to extra cost that is deemed unacceptable when seeking a solution that is as inexpensive as possible.

In rate gyro devices having a resonator with a plurality of vibrating beams, such as those described in documents FR 2 692 349 and FR 2 812 386, the frequency of vibration of the beams varies linearly as a function of temperature. With such devices, detecting a signal representative of the frequency of vibration makes it possible, knowing that frequency, to determine the temperature of the vibrating resonator. That solution provides very high performance since, given that the frequency detected is characteristic of the resonator, it is indeed the temperature of the resonator itself that can be accessed by that technique.

Nevertheless, although that solution is theoretically satisfactory, it is not easy to provide frequency-to-temperature conversion in analog manner. As a general rule, the information must be processed digitally. Unfortunately, any advanced solutions being sought at present must, in practice, remain compatible (e.g. in a retro-fit context) with existing gyro devices that make use of analog systems for processing information.

Consequently, accessing the internal temperature of the resonator by detecting the frequency of vibration of said resonator represents a solution that likewise needs to be avoided.

However, temperature compensation that takes account of the actual and instantaneous temperature of the resonator in a manner that is more exact and simpler than at present is becoming a necessity, given that users require rate gyro measurement devices, and in particular gyroscopic devices, to be ever more accurate.

SUMMARY OF THE INVENTION

An object of the invention is thus to propose an improved solution that nevertheless enables temperature compensation to be performed on the detected rotation in a manner that is at least as accurate as, but simpler than, that which is presently performed using a probe in the environment of the resonator, and without having recourse to digital electronics.

To this end, in a first of its aspects, the invention provides a rate gyro measurement method that is compensated as a function of the instantaneous internal temperature of a resonator in a gyro measurement device comprising:

at least one mechanical resonator;

a loop for controlling the amplitude of the vibration of the mechanical resonator; and a gyro loop suitable for delivering an output rate signal (S);

which method, in accordance with the invention, is characterized:

in that the gain control (P) of the loop for controlling the amplitude of the vibration is established so as to vary as a monotonic function of the internal temperature of said mechanical resonator over a given temperature range;

in that, during an initial calibration stage, correspondences are established and stored between firstly the values of the gyro scale factor (Fe) and the gyro bias ($S_0$), both of which are functions of the internal temperature of the mechanical resonator, and secondly the values of the gain control signal (P), i.e. F(P) and Q(P) being thus defined as respective models of (Fe) and ($S_0$); and in that, in operation, the following operations are performed:

$P \rightarrow F(P)$ $P \rightarrow Q(P)$ $\Omega_{est} = F(P) \cdot S + Q(P)$

By means of these provisions, a more exact estimate $\Omega'_{est}$ compensated as a function of the internal temperature of the mechanical resonator, of the mechanical rotation applied about the sensing axis of the mechanical resonator is obtained.

The invention is based essentially on the following considerations.

The signals for controlling the gain P and the measurement S are both functions of temperature. The signal for controlling gain P, which is a function of the internal temperature of the resonator, being available, it becomes conceivable, by selecting this control of gain P to be a monotonic function of temperature, to parameterize or model the signal of measurement S as a function of the signal P so as to compensate, at least in part, for the temperature variations in the signal of measurement S, and thus to improve the temperature stability of the device and its measurement performance.

Preferably the control of gain P of the amplitude control loop varies as an increasing monotonic function, and advantageously of the first order, of the internal temperature of said mechanical resonator so as to simplify implementation.

The provisions in accordance with the invention can advantageously be implemented to improve temperature stability over a given temperature range extending from −40° C. to +85° C.

The provisions of the method set out above find a preferred, but non-exclusive application with a mechanical resonator of the type having at least one vibrating beam, and in most particularly effective manner with a resonator having four vibrating beams of the types described in documents FR 2 692 349 and FR 2 812 386.

In a second of its aspects, the invention provides a rate gyro measurement device comprising:

at least one mechanical resonator;
a loop for controlling the amplitude of the vibration of the mechanical resonator; and
a gyro loop suitable for delivering an output gyro signal (S);

which device, when arranged in accordance with the invention, is characterized in that:

the loop for controlling the amplitude of the vibration is arranged in such a manner that its control of gain (P) varies as a monotonic function of the internal temperature of said mechanical resonator over a given temperature range;
memory means are provided for storing correspondences established during an initial calibration step between firstly the values of the gyro scale factor (Fe) and of the gyro bias ($S_0$), both of which are functions of the internal temperature of the mechanical resonator and, secondly, the values of the signal for controlling the gain (P), i.e. F(P) and Q(P) being respective models of (Fe) and ($S_0$) thus defined; and
information processor means are provided that are suitable, in operation, for performing the following operations:

$P \rightarrow F(P)$ $P \rightarrow Q(P)$ $\Omega'_{est} = F(P) \cdot S + Q(P)$

Thus, the rate gyro measurement device in accordance with the invention is suitable for delivering an analog output signal that is compensated as a function of the internal temperature of the mechanical resonator, and that is representative of the mechanical rotation applied about the sensing axis of the mechanical resonator.

In a preferred embodiment of the device in accordance with the invention, the control of the gain (P) of the amplitude control loop is arranged to vary as an increasing monotonic function, advantageously of the first order, of the internal temperature of said mechanical resonator.

In a practical embodiment, the device is arranged so that temperature compensation is ensured over a range extending from −40° C. to +85° C.

The rate gyro measurement device in accordance with the invention is suitable for finding a particularly advantageous, but non-exclusive application when the mechanical resonator is a resonator having at least one vibrating beam, and most particularly a resonator having four vibrating beams of the type taught in documents FR 2 692 349 and FR 2 812 386.

The solution proposed in the context of the present invention is particularly original and advantageous since it avoids the drawbacks and the shortcomings of prior solutions in the sense that it avoids having recourse to a temperature probe, that it avoids digital-to-analog conversion imposed by detecting the frequency of the resonator as a magnitude representative of the internal temperature of the resonator, and it implements a transposition of a purely analog magnitude (the signal for controlling the gain (P)), which surely is not an exact representation of the internal temperature of the resonator, but is nevertheless a representation that is sufficiently accurate to be able to lead to the desired information, while complying with the tolerance error that is acceptable in practice.

BRIEF DESCRIPTION OF THE DRAWINGS

The invention will be better understood on reading the following detailed description of a preferred embodiment given purely by way of illustration. In this description, reference is made to the accompanying drawings, in which.

DETAILED DESCRIPTION OF THE INVENTION

Figure 1:
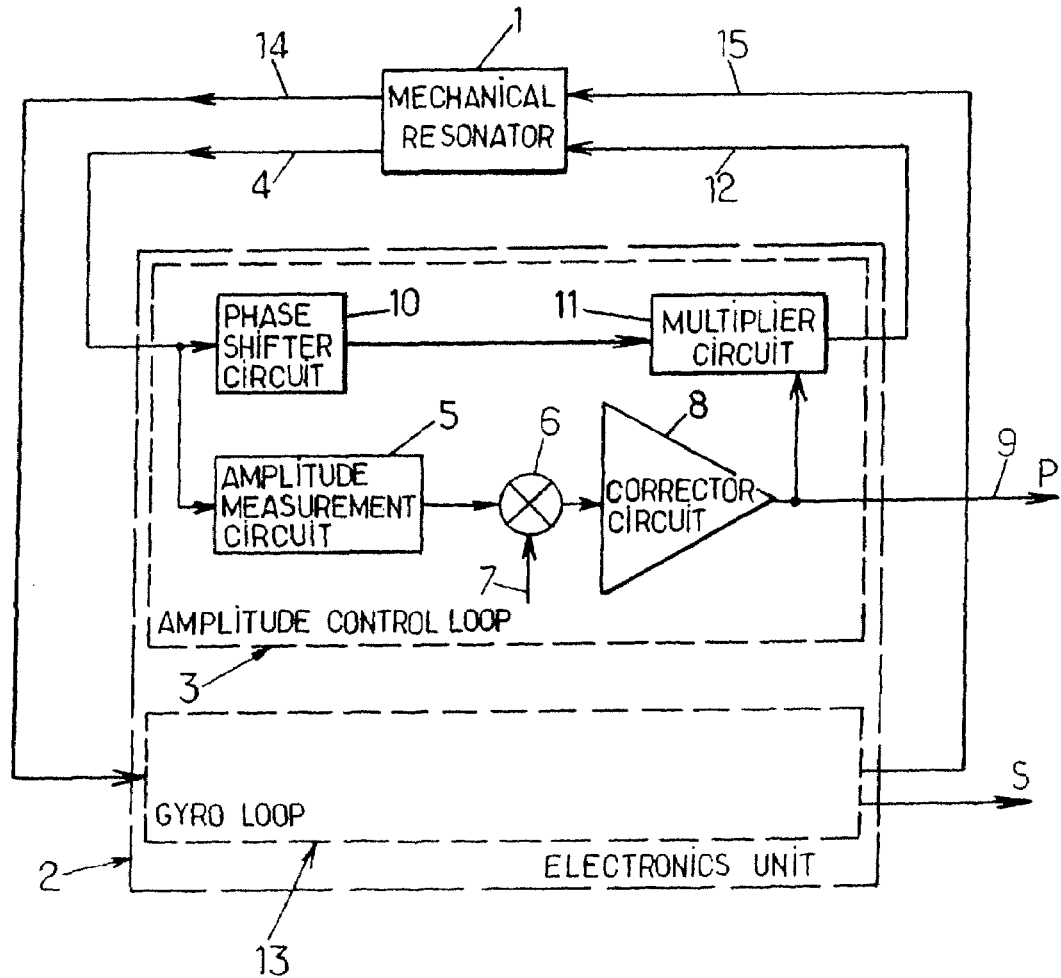
FIG. 1 is a highly diagrammatic block diagram of a rate gyro measurement device in the state of the art to which the invention applies.
Figure 2:
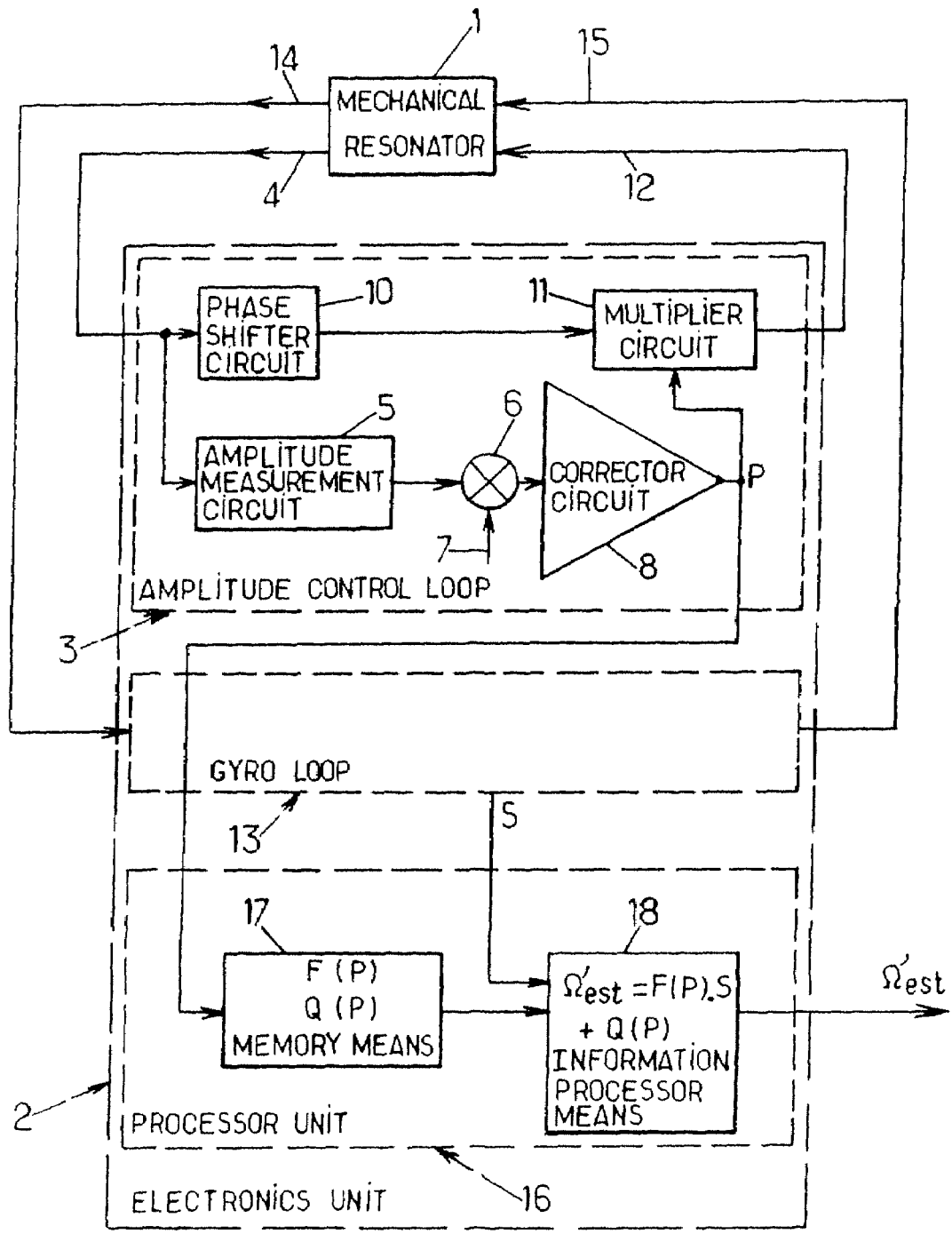
FIG. 2 is a highly diagrammatic block diagram of a rate gyro measurement device corresponding to that of FIG. 1 and improved in accordance with the invention.

The device shown diagrammatically in FIG. 2 is constructed in the same manner as that shown in FIG. 1, but with that difference that the electronics unit 2 for operating the rate gyro is also provided with a processor unit 16.

The processor unit 16 includes memory means 17 suitable for memorizing a relationship that is established, during an initial calibration stage (e.g. in an oven over the entire desired temperature range), between firstly values for the gyro scale factor Fe and the gyro bias $S_0$ both of which are functions of the internal temperature of the mechanical resonator, and secondly the values of the signal for controlling the gain P; F(P) and Q(P) will be used to designate the respective models of Fe and $S_0$ as defined in this way. The memory means 17 have an input connected to the output of the corrector circuit 8 so that the signal for controlling gain P is continuously delivered to said memory means 17 enabling them to act, in relation with the information contained in memory, to establish the values F(P) and Q(P) for each value of gain P.

The memory means 17 have an output connected to an input of information processor means 18, another input of which is connected to the output of the gyro loop 13 and receives the measurement signal S. The information processor means 18 are arranged to calculate a magnitude $\Omega'_{est}$ such that:

$$\Omega'_{est} = F(P) \cdot S + Q(P)$$

It is this magnitude $\Omega'_{est}$ that is output from the electronics unit 2 provided for operating the gyro, taking the place of the value S as delivered by conventional devices (FIG. 1).

Finally, the loop 3 for controlling the amplitude of the vibration of the mechanical resonator 1 is arranged in such a manner that the control of its gain P varies as a monotonic function of the internal temperature of said resonator 1 over a given temperature range. Advantageously, the control of the gain P of the amplitude control loop 3 is arranged to vary as an increasing monotonic function of the internal temperature of said resonator 1, and preferably, in order to simplify the means implemented, arrangements are made to ensure that this variation is an increasing monotonic function of the first order. Naturally, depending on the desired variation and/or accuracy, recourse could be had to a single polynomial, in particular of the first order, suitable for defining the entire variation curve, or else the variation curve could be defined as a succession of segments defined by a plurality of polynomials, in particular polynomials of the first order.

Furthermore, in practice, provision is made for said variation in the form of a monotonic function that is advantageously an increasing function and preferably of the first order, to be provided over an operating temperature range extending from about −40° C. to +85° C.

Under such conditions, the processor unit 16, after an initial calibration step (e.g. performed by the user using the user's own electronic means) for loading the memory means 17 and from the two input signals P as delivered by the amplitude control loop 3 and S as delivered by the gyro loop 13, can perform the following operations:

$$P \rightarrow F(P)$$

$$P \rightarrow Q(P)$$

$$\Omega'_{est} = F(P) \cdot S + Q(P)$$

the magnitude $\Omega'_{est}$ being compensated, at least in part, as a function of the internal temperature of the mechanical resonator 1.

The provisions in accordance with the invention can find an application in any continuous resonator rate gyro measurement device in which the control of gain P is a monotonic function of the internal temperature of the mechanical resonator. A preferred application lies in devices having vibrating beam resonators, and in more preferred manner in devices having resonators with four vibrating beams of the type described in documents FR 2 692 349 and FR 2 812 386.

The invention claimed is:

1. A rate gyro measurement method that is compensated as a function of an instantaneous internal temperature of a resonator in a gyro measurement device comprising:

at least one mechanical resonator;

a loop for controlling an amplitude of vibration of the mechanical resonator; and a gyro loop suitable for delivering an output gyro signal (S);

wherein a control of gain (P) of the loop for controlling the amplitude of vibration is established so as to vary as a monotonic function of the internal temperature of said mechanical resonator over a given temperature range;

wherein, during an initial calibration stage, correspondences are established and memorized between firstly values of a gyro scale factor (Fe) and a gyro bias ($S_0$) and secondly values of the signal for controlling gain (P), such that F(P) and Q(P) being thus defined as respective models of (Fe) and ($S_0$); and wherein, in operation, the following operations are performed:

$$P \rightarrow F(P)$$

$$P \rightarrow Q(P)$$

$$\Omega'_{est} = F(P) \cdot S + Q(P)$$

whereby a more accurate estimate, compensated as a function of the internal temperature of the resonator, of the mechanical rotation applied about a sensing axis of the mechanical resonator is obtained in analog form.

2. A method according to claim 1, wherein the control of gain (P) of the loop for controlling amplitude varies as an increasing monotonic function of the internal temperature of said mechanical resonator.

3. A method according to claim 2, wherein the control of gain (P) of the loop for controlling the amplitude varies as an increasing monotonic function of a first order of the internal temperature of said mechanical resonator.

4. A method according to claim 1, wherein the given temperature range extends from −40° C. to +85° C.

5. A method according to claim 1, wherein the mechanical resonator is a resonator having at least one vibrating beam, and in particular four vibrating beams.

6. A rate gyro measurement device comprising:

at least one mechanical resonator;

a loop for controlling an amplitude of the vibration of the mechanical resonator; and a gyro loop suitable for delivering an output gyro signal (S);

wherein the loop for controlling the amplitude of the vibration is arranged in such a manner that a control of gain (P) varies as a monotonic function of an internal temperature of said mechanical resonator over a given temperature range;

wherein memory means are provided for storing correspondences established during an initial calibration step between firstly values of a gyro scale factor (Fe) and of a gyro bias ($S_0$) and, secondly, values of the signal for controlling gain (P), such that F(P) and Q(P) being respective models of (Fe) and ($S_0$) thus defined; and wherein information processor means are provided suitable, in operation, for performing the following operations:

$$P \to F(P)$$

$$P \to Q(P)$$

$$\Omega'_{est} = F(P) \cdot S + Q(P)$$

whereby the gyro measurement device is suitable for delivering an output analog signal, compensated as a function of the internal temperature of the mechanical resonator, which is representative of the mechanical rotation applied about a sensing axis of the mechanical resonator.

7. A device according to claim 6, wherein the control of gain (P) of the loop for controlling the amplitude is arranged to vary as an increasing monotonic function of the internal temperature of said mechanical resonator.

8. A device according to claim 7, wherein the control of gain (P) of the loop for controlling the amplitude is arranged to vary as an increasing monotonic function of a first order of the internal temperature of said mechanical resonator.

9. A device according to claim 6, wherein the given temperature range extends from −40° C. to +85° C.

10. A device according to claim 6, wherein the mechanical resonator is a resonator having at least one vibrating beam, and in particular four vibrating beams.

* * * * *